(12) United States Patent
Inoue et al.

(10) Patent No.: US 7,245,123 B2
(45) Date of Patent: Jul. 17, 2007

(54) ROLLING ELEMENT BEARING UNIT WITH SENSOR AND HUB UNIT WITH SENSOR

(75) Inventors: Masahiro Inoue, Nara (JP); Kenji Sakamoto, Kashiba (JP); Katsura Koyagi, Kashiwara (JP)

(73) Assignee: Jtekt Corporation, Osaka (JP)

( * ) Notice: Subject to any disclaimer, the term of this patent is extended or adjusted under 35 U.S.C. 154(b) by 210 days.

(21) Appl. No.: 10/514,477

(22) PCT Filed: May 16, 2003

(86) PCT No.: PCT/JP03/06105

§ 371 (c)(1),
(2), (4) Date: Nov. 16, 2004

(87) PCT Pub. No.: WO03/102434

PCT Pub. Date: Dec. 11, 2003

(65) Prior Publication Data

US 2005/0169563 A1    Aug. 4, 2005

(30) Foreign Application Priority Data

May 17, 2002  (JP) ............................ 2002-142417
Jan. 31, 2003  (JP) ............................ 2003-023375
Jan. 31, 2003  (JP) ............................ 2003-023378
Mar. 12, 2003 (JP) ............................ 2003-066107

(51) Int. Cl.
*G01B 7/24*  (2006.01)
*G01R 33/18* (2006.01)
*G01P 3/48*  (2006.01)
*G01L 1/00*  (2006.01)
*F16C 32/00* (2006.01)

(52) U.S. Cl. ................ 324/209; 324/166; 73/862.541; 384/448

(58) Field of Classification Search ........ 324/160–180, 324/209; 384/448; 73/779, 862.322, 862.69, 73/862.541
See application file for complete search history.

(56) References Cited

U.S. PATENT DOCUMENTS

2002/0196989 A1 * 12/2002 Katano ....................... 384/448

FOREIGN PATENT DOCUMENTS

| EP | 0 432 122    | 6/1991  |
|----|--------------|---------|
| JP | 60-244811    | 12/1985 |
| JP | 1-206113     | 8/1989  |
| JP | 125917/91    | 12/1991 |
| JP | 42749/93     | 6/1993  |
| JP | 9-174384     | 7/1997  |
| JP | 2001-21577   | 1/2001  |
| JP | 2001-33322   | 2/2001  |
| JP | 2001033322 A * | 2/2001 |

* cited by examiner

*Primary Examiner*—Edward Lefkowitz
*Assistant Examiner*—Kenneth J. Whittington
(74) *Attorney, Agent, or Firm*—Oblon, Spivak, McClelland, Maier & Neustadt, P.C.

(57) ABSTRACT

A sensor-equipped hub unit comprises a hub unit 1 having a wheel-side raceway member 4, a body-side raceway member 5, and two rows of rolling bodies 6, and a sensor device 2 provided on the hub unit 1. The sensor device 2 has a magnetostrictive sensor 31 for detecting a reverse magnetostrictive effect of the raceway member 4 produced by a force exerted thereon by the rolling bodies 6. The sensor device 2 detects rotation from the number of repetitions of a variation in strain and also detects the force acting on the wheel-side raceway member 4 from the amplitude of strain.

20 Claims, 8 Drawing Sheets

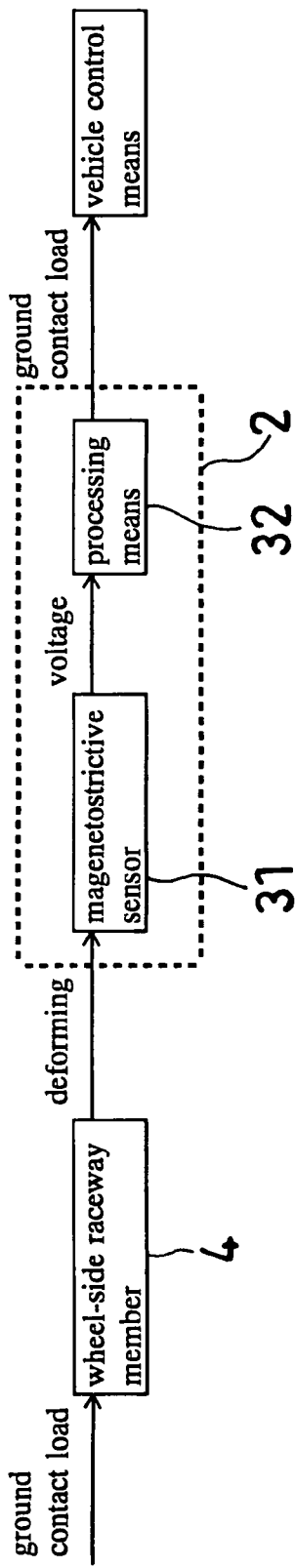
Fig. 2
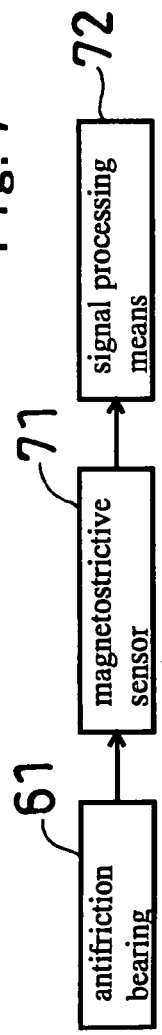
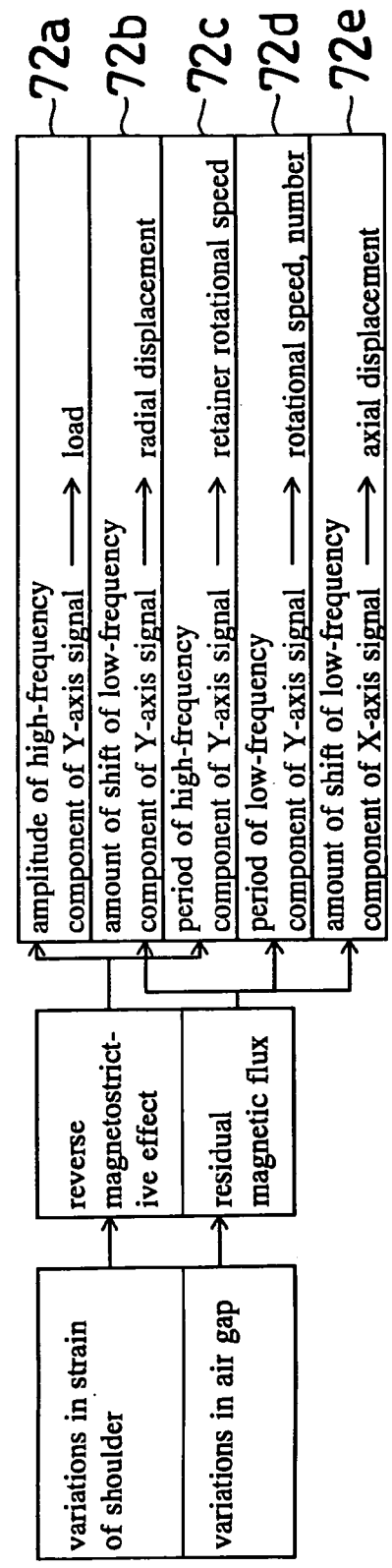
Fig. 7

Fig. 8
waveform of Y-direction detecting element
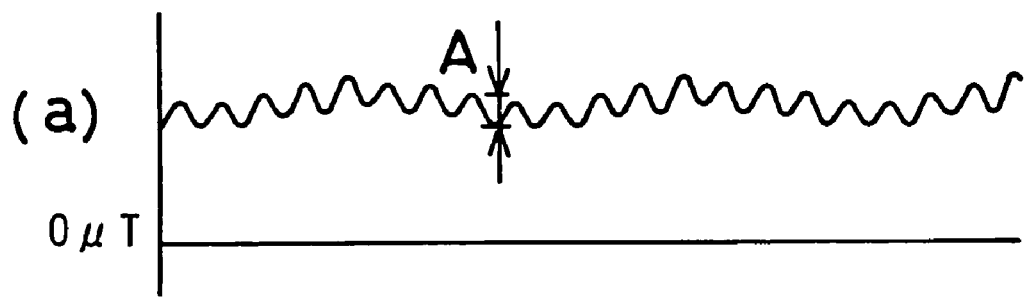
(a)
⇩ subjecting signal to FFT
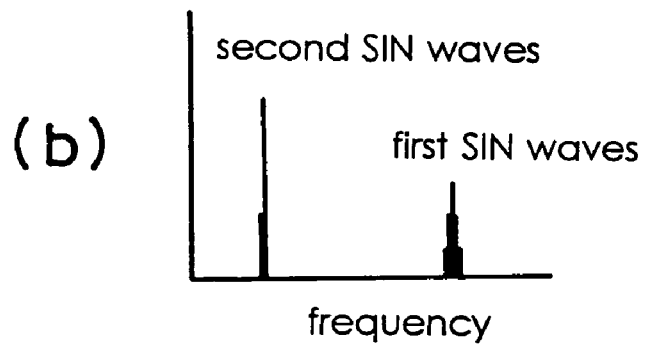
(b)
⇩ processing signal by LPF
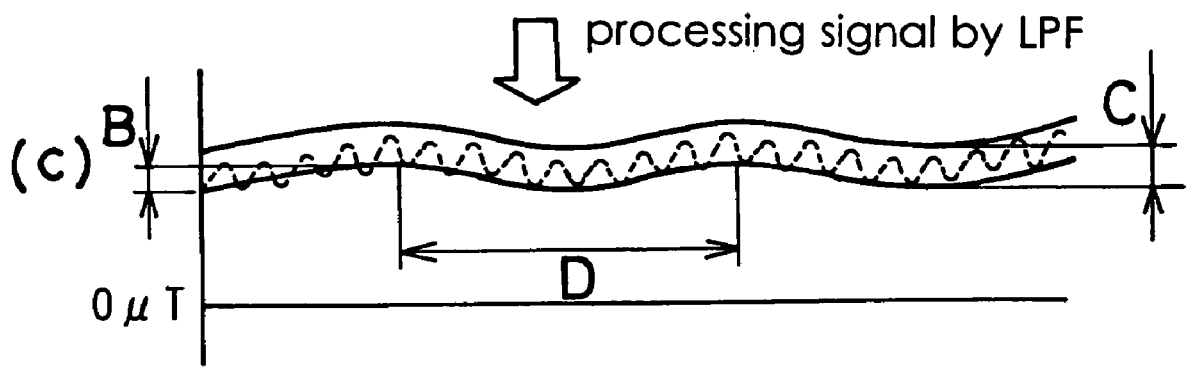
(c)

Fig. 9
waveform of X-direction detecting element
(a)
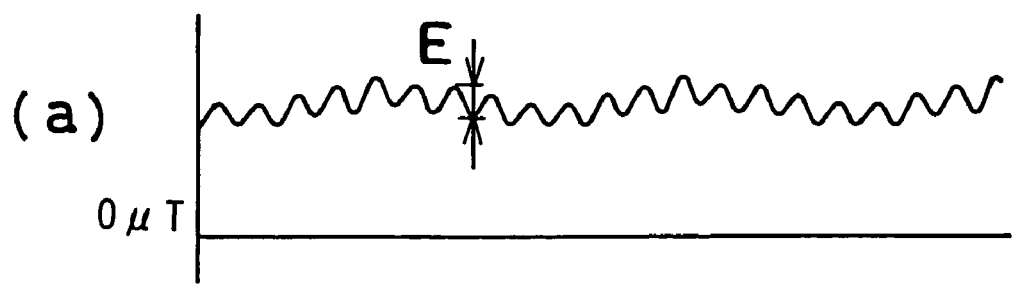
processing signal by LPF
(b)
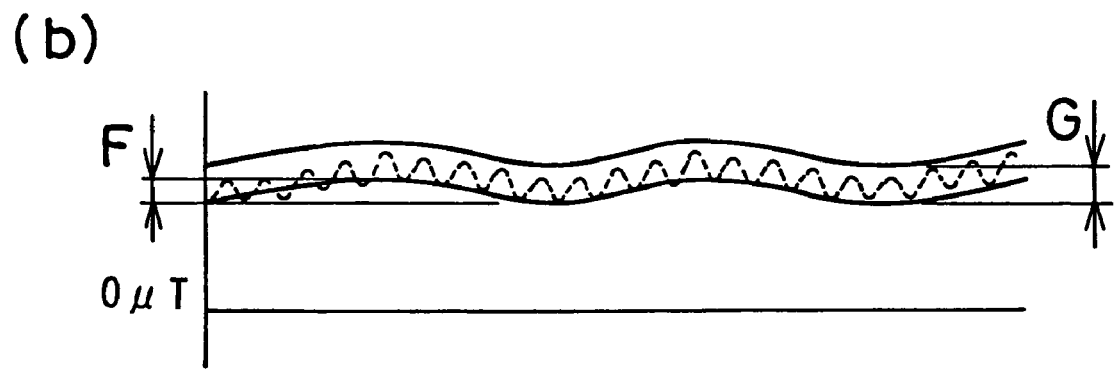

ROLLING ELEMENT BEARING UNIT WITH SENSOR AND HUB UNIT WITH SENSOR

TECHNICAL FIELD

The present invention relates to antifriction bearing units comprising an antifriction bearing and a sensor device joined to the antifriction bearing for detecting various items of data as to the antifriction bearing, and also to hub units which have a sensor and which are each in the form of an assembly comprising a hub unit serving as a component of a motor vehicle and a sensor device joined to the hub unit for detecting various items of data as to the motor vehicle.

BACKGROUND ART

Since various items of data are required for controlling motor vehicles, it has been proposed to provide a sensor on a hub unit comprising a wheel-side raceway member to which a wheel is to be attached, a body-side raceway member to be fixed to the vehicle body, and two rows of rolling bodies arranged between the two raceway members.

For example, Patent Literature 1 (the publication of JP-A No. 3-209016) discloses a sensor-equipped hub unit wherein an annular support member is attached to the inner end face of a body-side raceway member and provided with a strain sensor.

Further Patent Literature 2 (the publication of JP-A No. 1-206113) discloses a sensor-equipped antifriction bearing unit which comprises an antifriction bearing having a fixed-side raceway member, a rotation-side raceway member and rolling bodies, and a load- and temperature-measuring strain gauge attached to the outer side of an outer ring serving as the fixed-side raceway member of the antifriction bearing.

In recent years, the control means in use for motor vehicles include drive force control means not permitting spinning of the drive wheels when the vehicle is started or accelerated, and braking force control means for suppressing lateral skidding for cornering, in addition to the ABS control means (antilock brake system). To ensure more accurate control, it has become important to detect data which is usable effectively for these modes of control.

In view of the above situation, the present inventor has conceived the idea of improving the control of vehicles by accurately measuring the ground contact load acting on the tire.

However, since the hub unit of Patent Literature 1 having a sensor is adapted to measure the strain of the annular support member, the ground contact load determined from the strain involves a great error, so that the hub unit has the problem that the ground contact load can not be obtained with high accuracy from the measurement of the strain sensor. Additionally, a rotation sensor is required for measuring the speed of rotation, and a displacement sensor is necessary for measuring axial displacement.

The antifriction bearing unit of Patent Literature 2 has the advantage that both load and temperature can be measured by a single sensor (strain sensor), whereas the force to be exerted by the rolling bodies on the raceway member involves great measuring errors, so that the unit has the problem that the force acting on the raceway member can not be obtained from the measurement of the strain gauge with high accuracy.

An object of the present invention is to provide a hub unit having a sensor and adapted to measure ground contact loads with high accuracy and to detect the rotation of the wheel.

Another object of the invention is to provide an antifriction bearing unit having a sensor and adapted to accurately measure the force acting on the raceway member of a bearing and to detect rotation.

DISCLOSURE OF THE INVENTION

The present invention provides a sensor-equipped antifriction bearing unit comprising an antifriction bearing having a fixed-side raceway member, a rotation-side raceway member and rolling bodies, and a sensor device provided on the bearing, the antifriction bearing unit being characterized in that the sensor device has a magnetostrictive sensor for detecting a reverse magnetostrictive effect of the raceway member produced by a force exerted thereon by the rolling bodies.

The invention also provides a sensor-equipped hub unit comprising a hub unit having a wheel-side raceway member to be attached to a wheel, a body-side raceway member to be fixed to a vehicle body, and two rows of rolling bodies arranged between the two raceway members, and a sensor device provided on the hub unit, the sensor-equipped hub unit being characterized in that the sensor device has a magnetostrictive sensor for detecting a reverse magnetostrictive effect of the raceway member produced by a force exerted thereon by the rolling bodies.

The magnetostrictive sensor is adapted to measure a reverse magnetostrictive effect (the phenomenon that when a substance strains or deforms, a magnetic force is produced). Examples of magnetostrictive sensors are a magnetic impedance sensor (MI sensor) for measuring external magnetic fields utilizing the electromagnetic phenomenon that the impedance between opposite ends of a magnetic wire having a high magnetic permeability is altered by an external magnetic field when a high-frequency current is passed through the wire, or a stress impedance sensor (SI sensor) utilizing variations in impedance due to stress.

The sensor-equipped antifriction bearing unit of the present invention has a magnetostrictive sensor for detecting the reverse magnetostrictive effect of the raceway member to be produced by a force exerted thereon by the rolling bodies, so that the strain of the raceway member can be detected with high accuracy. Accordingly, the force acting on the raceway member can be detected contactlessly with high accuracy.

Stated more specifically, when a rotating body fixed to the rotation-side raceway member of the bearing is rotated or subjected to a load, the force acting between the rolling body and the raceway surface or the shoulder portion of the raceway member alters, consequently varying the amount of strain of the raceway surface or shoulder portion of the raceway member to produce a reverse magnetostrictive effect. Although this effect is of a small value of the order of milligauss, the variations in the amount of strain can be detected by the magnetostrictive sensor as magnetostrictive variations. Variations in the force acting on the raceway member can be calculated backward from the variations in strain. Since the rolling bodies are revolved, the strain is repeated with a frequency corresponding to rotation, e.g., to the number of rolling bodies, rotational speed or the total number of rotations. Data as to the rotation of the antifriction bearing unit (rotation-side raceway member) can be obtained by using the number of repetitions for processing by a suitable circuit, and the force acting on the raceway member is detectable from the amplitude of strain. Thus, two kinds of important data relating to the behavior of the bearing can be obtained using a single sensor.

The antifriction bearing to be used is any one of those including a deep groove ball bearing, angular ball bearing, roller bearing, needle bearing and thrust bearing. Not only bearings of single row but also those having more than one row are usable.

The fixed-side raceway member is attached to a housing or the like, while the rotation-side raceway member is mounted on a rotating shaft or the like. Generally, the magnetostrictive sensor is attached to the fixed-side raceway member or a housing or like fixed-side member having the fixed-side raceway member attached thereto. The term the "fixed-side member" means a member which is rotatable relative to the rotation-side member, and need not always be fixed. The term "fixed-side member" includes a case wherein the member itself rotates.

With the sensor-equipped hub unit of the invention, the magnetostrictive sensor for detecting the reverse magnetostrictive effect of the raceway member resulting from the force exerted thereon by the rolling bodies accurately measures the strain of the wheel-side or body-side raceway member. Accordingly, the force exerted on the wheel-side or body-side raceway member by the ground, i.e., the ground contact load, can be detected with high accuracy.

The ground contact load on each of tires varies with variations in the speed of the vehicle or with alterations in the posture thereof during travel. At this time, the force exerted by the rolling bodies on the wheel-side raceway member and the body-side raceway member varies with the ground contact load. Variations in this force appear as variations in the strain of the wheel-side raceway member and the body-side raceway member in the vicinity of the rolling bodies, and the magnetostrictive sensor is capable of measuring the variations in strain as magnetostrictive variations. Variations in the ground contact load can be calculated backward from the variations in strain. The revolution of the rolling bodies produces a strain which is repeated with a frequency corresponding to the number of rolling bodies and the rotational speed. The number of repetitions is usable for obtaining data as to the rotation of the hub unit (rotational speed, total number of rotations, etc.). The ground contact load on the tire thus determined is used as substituted data for the slip ratio in ABS control and used also for controlling the drive force or brake force, thus contributing to improved accuracy in controlling vehicles.

With the sensor-equipped antifriction bearing unit described above, the sensor device is preferably adapted to detect rotation from the number of repetitions of a variation in strain and the force acting on the raceway member from the amplitude of strain.

With the rolling bodies in revolution, strain is repeated with a frequency corresponding to the number of rolling bodies and the rotational speed, and the rotational speed of the antifriction bearing unit can be obtained by using this number of repetitions for processing by a suitably constructed circuit. The force acting on the wheel-side raceway member is detectable from the amplitude of strain. Thus, two kinds of important data relating to the behavior of the bearing can be obtained using a single sensor.

With the sensor-equipped hub unit described, the sensor device is preferably a sensor for detecting the rotation of the wheel from the number of repetitions of a variation in strain and also for detecting the ground contact load on the wheel from the amplitude of strain.

In addition to the round contact load on the wheel, the number of rotations of the wheel, rotational speed and like data as to rotation are detected from the number of repetitions of a variation in strain, whereby two kinds of important vehicle control data can be obtained using a single sensor.

With the sensor-equipped antifriction bearing unit and the sensor-equipped hub unit described, it is desirable that the rolling bodies be made of a nonmagnetic material. Examples of useful materials for the raceway members are high-carbon chromium bearing steel, such as SUJ2, and various other bearing steels. Examples of suitable nonmagnetic materials for the rolling bodies are SUS304 and like austenitic stainless steels, silicon nitride and like ceramic materials, chromium-molybdenum steel, etc. since a predetermined strength is required.

Even if the rolling body moves toward or away from the magnetostrictive sensor, such a movement of the rolling body exerts no influence on the magnetic field since the rolling body is made of a nonmagnetic material. It is likely that the circularity of the raceway members or the shape of rolling bodies will vary from bearing to bearing, whereas such variations are unlikely to be involved in errors, permitting the sensor to contactlessly detect the force acting on the raceway member with high accuracy. Thus, the bearing unit and the hub unit of the invention can be free of the problem of impaired accuracy of detection that would result when the sensor detects minute changes in the magnetic field to be produced by the movement of a magnetic rolling body or retainer toward or away from the sensor, or the problem of impaired accuracy attributable to varying loads due to differences in the circularity of the raceway member or in the shape of rolling bodies between individual bearings.

The antifriction bearing unit and the hub unit described further has a retainer, which is made preferably of a nonmagnetic material.

The retainer also moves toward or away from the magnetostrictive sensor during rotation, so that the nonmagnetic material used for the retainer prevents the retainer from affecting the magnetic field, consequently permitting the sensor device to contactlessly detect the force acting on the raceway member with high accuracy.

Examples of nonmagnetic materials for the retainer are brass or like metal and synthetic resin or like nonmetallic material.

The nonmagnetic materials for the rolling bodies and the retainer are suitably changeable insofar as an adverse effect on the magnetostrictive sensor is avoidable. Thus, the term "nonmagnetic material" includes a perfectly nonmagnetic material and materials having slight magnetic properties producing no influence on the sensor.

With the sensor-equipped antifriction bearing unit and sensor-equipped hub unit described, the magnetostrictive sensor has a detecting face in an axial direction and a detecting face in a radial direction, and detects all of the axial displacement of the rotation-side (wheel-side) raceway member, the radial displacement of the rotation-side (wheel-side) raceway member, the force acting on the rotation-side (wheel-side) raceway member and rotation data thereof.

The magnetostrictive sensor has directionality. The magnetostrictive sensor having a detecting face in the axial direction and a detecting face in the radial direction can be obtained, for example, by providing a detecting element in the direction of X-axis and a detecting element in the direction of Y-axis on a rectangular base board.

The axial displacement of the rotation-side (wheel-side) raceway member is determined from the output value of an X-axis signal detectable by the detecting face in the axial direction (the detecting element opposed to the direction of X-axis) of the sensor.

The radial displacement of the rotation-side raceway member is determined from the output value of a Y-axis signal detectable by the detecting face in the radial direction (the detecting element opposed to the direction of Y-axis) of the sensor. Radial eccentricity and the amount of expansion due to a centrifugal force can also be determined from the radial displacement.

The force acting on the rotation-side (wheel-side) raceway member, such as a load thereon, is determined from the reverse magnetostrictive effect detected by the radial direction detecting face or radial direction detecting face of the magnetostrictive sensor (from the output value of the X-axis signal or Y-axis signal). When a rotating body such as a main shaft, fixed to the rotation-side raceway member is rotated or subjected to a load, the force acting between the rolling body and the raceway surface or shoulder portion of the raceway member alters, consequently varying the amount of strain of the raceway surface or shoulder portion of the raceway member to produce a reverse magnetostrictive effect. Although this effect is of a small value of the order of milligauss, the variations in the amount of strain can be detected by the magnetostrictive sensor as magnetostrictive variations. Variations in the force acting on the raceway member can be calculated backward from the variations in strain. Similarly, when the wheel fixed to the wheel-side raceway member rotates or the hub unit is subjected to a load, the force acting between the rolling body and the raceway surface or shoulder portion of the raceway member alters, consequently varying the amount of strain in the raceway surface or shoulder portion of the raceway member to produce a reverse magnetostrictive effect. Although this effect is of a small value of the order of milligauss, the variations in the amount of strain can be detected by the magnetostrictive sensor as magnetostrictive variations. The ground contact load on the wheel (tire) can be calculated backward from the variations in strain.

The data as to rotation is obtained from the frequency of the X-axis signal or Y-axis signal detected by the detecting face of the magnetostrictive sensor in the axial direction or the detecting face thereof in the radial direction.

The waveform obtained by the magnetostrictive sensor is the combination of the waveform of high-frequency sine waves due to the force exerted by the rolling bodies and the waveform of low-frequency sine waves due to the rotation of the rotation-side (wheel-side) raceway member. The speed of revolution of the rolling bodies is determined from the frequency of high-frequency sine waves, the acting force such as load from the amplitude of high-frequency sine waves, the rotational speed of the rotation-side (wheel-side) raceway member from the frequency of low-frequency sine waves, and the radial eccentricity or the amount of end deflection of the rotation-side (wheel-side) raceway member from the amplitude of low-frequency sine waves.

With the sensor-equipped antifriction bearing unit and the sensor-equipped hub unit of the present invention, the force acting on the raceway member can be detected by the magnetostrictive sensor contactlessly with high accuracy, and in addition to the force acting on the raceway member, all of the axial displacement, radial displacement and rotation data can be obtained by this sensor. This realizes a saving in space and a reduction in cost.

Preferably, the rotational speed of the rotation-side (wheel-side) raceway member to be determined from variations in the axial displacement or the radial displacement thereof with time and the speed of revolution of the rolling body to be determined from the number of repetitions of a variation in the strain due to the force exerted by the rolling bodies, of the rotation-side (wheel-side) raceway member are detected as the rotation data.

While the magnetostrictive sensor affords the rotation data (rotational speed, total number of rotations, etc.) of the rotation-side (wheel-side) raceway member, the sensor also determines the speed of revolution of the rolling body, i.e., the rotational speed of the retainer, from the variations in strain to be used in determining the force acting on the raceway member. Accordingly, it becomes possible to detect an abnormal delay in the frequency of revolution of the rolling body from the speed of revolution of the rolling body, for the detection of faults such as an abnormal slip of the antifriction bearing and ingress of extraneous matter.

Preferably, changes in the residual magnetic flux of the rotation-side (wheel-side) raceway member are detected to detect the axial displacement and the radial displacement of the rotation-side (wheel-side) raceway member. The residual magnetic flux to be used is that produced when the raceway member is made.

This makes it possible to detect the above items (the four items of axial displacement, radial displacement, load and rotational speed, or five items of these four and the speed of revolution of the rolling body) without additionally providing on the raceway member the portion (such as a magnetized portion) to be detected by the magnetostrictive sensor or machining the member for the detection.

With the sensor-equipped antifriction bearing unit and the sensor-equipped hub unit described, the magnetostrictive sensor has a detecting face in a radial direction, and detects the eccentricity of the rotation-side (wheel-side) raceway member and the force acting on the rotation side (wheel-side) raceway member.

Further with the sensor-equipped antifriction bearing unit and the sensor-equipped hub unit described, the magnetostrictive sensor has a detecting face in a radial direction, and detects the amount of expansion of the rotation-side (wheel-side) raceway member and the force acting on the rotation-side (wheel-side) raceway member.

The magnetostrictive sensor used in the sensor-equipped antifriction bearing unit and the sensor-equipped hub unit includes only a detecting element having a detecting face in the radial direction, whereby the radial displacement of the rotation-side (wheel-side) raceway member, the force acting on this raceway member and rotation data are detected.

With the sensor-equipped antifriction bearing unit and the sensor-equipped hub unit wherein the magnetostrictive sensor detects the eccentricity of the rotation-side (wheel-side) raceway member and the force acting on the rotation-side (wheel-side) raceway member, the force acting on the raceway member can be detected contactlessly with high accuracy, and data as to the eccentricity of the rotation-side raceway member is also available. Thus, the force acting on the raceway member and the data for checking the antifriction bearing for malfunctions can be obtained by the single magnetostrictive sensor. This achieves a saving in space and a cost reduction. The same magnetostrictive sensor may of course be so adapted as to detect physical quantities other than the eccentricity of the rotation-side (wheel-side) raceway member and the force acting on this raceway member, along with these latter values.

In the case of the sensor-equipped antifriction bearing unit and the sensor-equipped hub unit wherein the magnetostrictive sensor detects the amount of expansion of the rotation-side (wheel-side) raceway member and the force acting on this raceway member, the force acting on the raceway member can be detected contactlessly with high accuracy, and the amount of expansion of the rotation-side (wheel-side) raceway member can also be obtained. Since the amount of expansion varies with the centrifugal force (rotational speed) and heat, the expansion value is usable for checking the antifriction bearing for abnormal rotational speeds or abnormal temperatures. Thus, the force acting on the raceway member and data for use in checking the antifriction bearing for malfunctions or faults can be obtained by the single magnetostrictive sensor. This realizes a saving in space and a cost reduction. The same magnetostrictive sensor may of course be so adapted as to detect physical quantities other than the amount of expansion of the rotation-side (wheel-side) raceway member and the force acting on this raceway member, along with these latter values.

With the sensor-equipped antifriction bearing unit and the sensor-equipped hub unit described, the magnetostrictive sensor is a magnetic impedance sensor, and the rotation-side (wheel-side) raceway member may be provided with an annular magnetized portion opposed to the sensor.

The magnetized portion may be in the form of a rubber magnetic body which is so magnetized that N poles and S poles are arranged alternately at equal intervals, or in the form of a film on which a row of magnetic ink bars are printed. The magnetic impedance sensor is provided in a sealed inner region and detects variations in the force exerted on the rotation-side (wheel-side) raceway member by the rolling bodies from changes in the magnetic field set up by the magnetized portion. The detected value is converted to a load. The magnetic impedance sensor (MI sensor), which is already known, is adapted to measure minute changes in the magnetic field with high accuracy to detect the ground contact load and the rotation of the wheel with high accuracy. The reverse magnetostrictive effect described is detectable by the magnetic impedance sensor even if the magnetized portion, which is designed to achieve improved accuracy, is not provided.

The sensor-equipped bearing unit described, which is provided as a hub unit, is otherwise applicable to various devices, such as machine tools, wherein an antifriction bearing is used. The detection of radial displacement, eccentricity, and amount of expansion is more useful in hub units or machine tools, while detection of axial displacement is more useful in machines tools (for example, for the control of cutting teeth).

BRIEF DESCRIPTION OF THE DRAWINGS

FIG. 2 is a block diagram of a sensor device of the hub unit of the first embodiment.

FIG. 7 is a block diagram of a sensor device of the hub unit of the third embodiment.

FIG. 8 is a diagram showing a procedure for processing a radial signal of the antifriction bearing unit of the third embodiment.

FIG. 9 is a diagram showing a procedure for processing ax axial signal of the antifriction bearing unit of the third embodiment.

BEST MODE OF CARRYING OUT THE INVENTION

Embodiments of the present invention will be described below with reference to the drawings.

Figure 1:
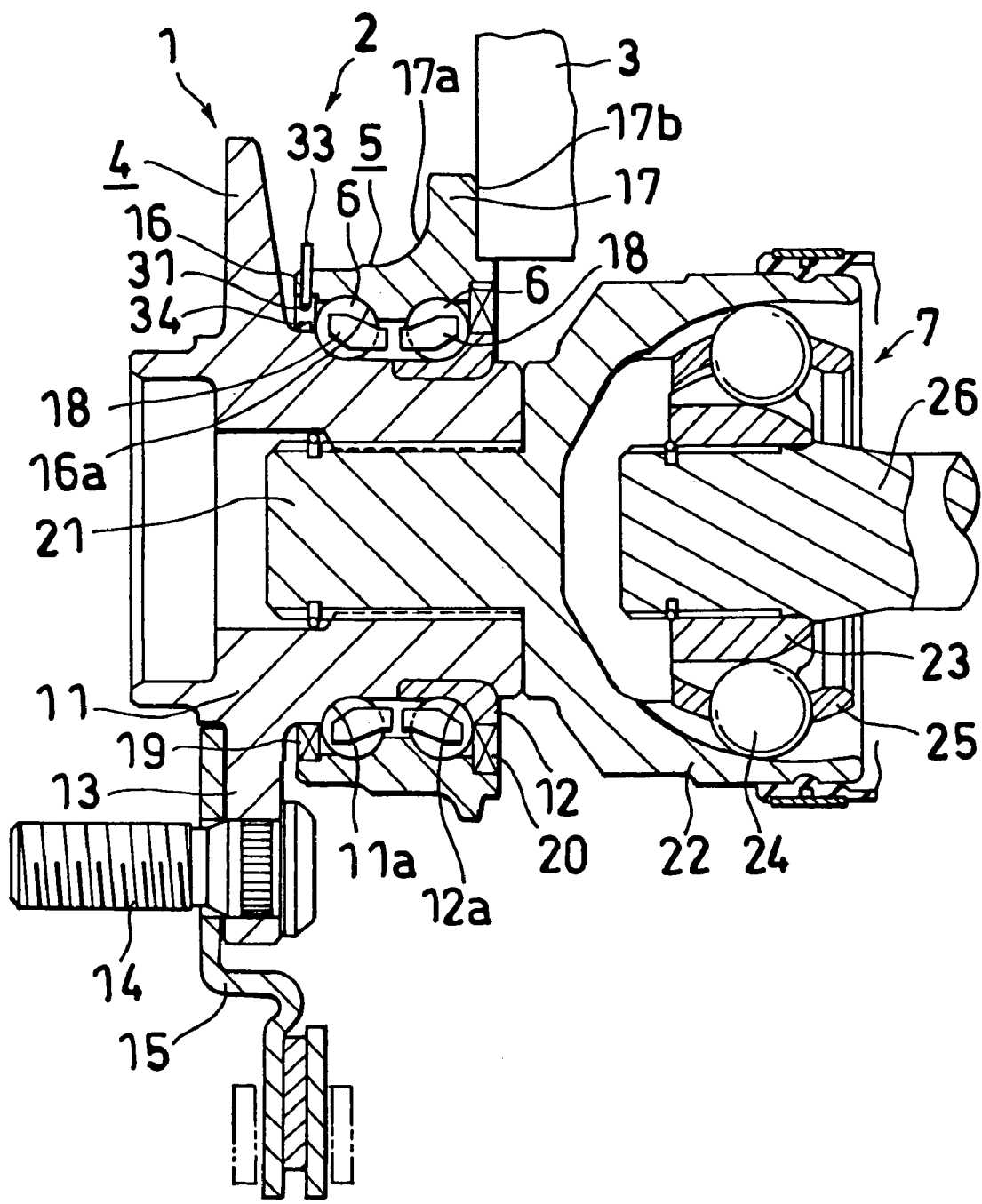
FIG. 1 is a view in vertical section showing a sensor-equipped hub unit as a first embodiment of sensor-equipped antifriction bearing unit according to the invention.

FIGS. 1 and 2 show a sensor-equipped hub unit as a first embodiment of sensor-equipped antifriction bearing unit of the invention. In the following description, the terms "left" and "right" refer respectively to the left- and right-hand sides of FIG. 1. The left side is the outside of a vehicle, and the right side is the inside of the vehicle.

FIG. 1 shows a sensor-equipped hub unit which comprises a hub unit 1 and a sensor device 2. The hub unit 1 has a wheel-side raceway member (rotation-side raceway member) 4 to which a wheel (not shown) is to be attached, a body-side raceway member (fixed-side raceway member) 5 to be fixed to a vehicle body 3 and two rows of rolling bodies 6 arranged between the two raceway members 4, 5. The sensor device 2 is provided on at least one of the two raceway members 4, 5 of the hub unit 1.

The hub unit 1 is of the type for use on drive wheels of motor vehicles and is coupled to a constant velocity joint 7.

The wheel-side raceway member 4 comprises a hollow hub wheel 11, and an inner ring 12 fixedly fitted around a right end portion of the hub wheel 11. The hub wheel 11 has a flange 13 close to the left end thereof. An inner raceway 11a is formed on an outer peripheral portion of the hub wheel 11 between the flange 13 and the inner ring 12. The inner ring 12 has an inner raceway 12a in parallel to the inner raceway 11a. The flange 13 of the hub wheel 11 is fixedly provided with a plurality of bolts 14 for fixing a wheel. A disk rotor 15 of a disk brake device is attached to the flange.

The body-side raceway member 5 has the function of the outer ring (fixed ring) of a bearing, and has a cylindrical portion 16 provided with two outer raceways 16a on the inner periphery thereof, and a flange portion 17 provided at the right end of the cylindrical portion 16 and attached by bolts (not shown) to a suspension (vehicle body) 3. The flange portion 17 has a base end part 17a provided with a curved surface. An outer portion of right side of the flange portion 17 has an annular cutout part 17b, the bottom face (orthogonal to the axial direction) of which serves as a face for attaching the hub unit 1 to the vehicle body 3.

The two rows of rolling bodies 6 are arranged as held by respective retainers 18 between the raceways 11a, 12a and 16a of the two raceway member 4, 5. Seal devices 19, 20 are provided respectively between the left end of the body-side raceway member 5 and the hub wheel 11 and between the right end of the body-side raceway member 5 and the right end of the inner ring 12.

The constant velocity joint 7, which is of the bar field type, comprises a rod portion 21 fixedly fitted in the hub wheel 11, an outer ring 22 integral with the right end of the rod portion 21 and having a concave surface, an inner ring 23 opposed to the outer ring 22 and fixed to a drive shaft 26 connected to a differential unit (not shown), and balls 24 and a retainer 25 arranged between the two rings 22, 23.

The body-side raceway member 5 and the wheel-side raceway member 4 are made of a high-carbon chromium bearing steel (SUJ2), the balls 24 of ceramic, and the retainer 25 of brass. The raceway members 5, 4 have magnetic properties, while the balls 24 and retainer 25 are made of a nonmagnetic material.

The sensor device 2 comprises a magnetostrictive sensor 31 attached to the body-side raceway member 5, and means 32 (not shown in FIG. 1, see FIG. 2) for processing the output of the magnetostrictive sensor 31.

According to the embodiment, the magnetostrictive sensor 31 is a magnetic impedance sensor and is supported by a support member 33 fixed to the cylindrical portion 16 of the body-side raceway member 5. The support member 33 extends radially of the hub unit and has a base end fixed to the cylindrical portion 16 of the body-side raceway member 5. The magnetostrictive sensor 31 is provided at the forward end of the support member 33 and positioned inside the seal device 19. The wheel-side raceway member 4 is provided with an annular magnetized portion 34 at a location opposed to the sensor 31. The magnetized portion 34 comprises a resin film bearing a row of magnetic ink bars printed thereon and affixed to the outer peripheral surface of the hub wheel 11 in the vicinity of the inner ring raceway 11a. Variations in the strain of the hub wheel 11 due to a force exerted thereon by the rolling bodies 6 change a magnetic field set up by the magnetized portion itself. Thus, the magnetic impedance sensor serving as the magnetostrictive sensor 31 is adapted to detect variations in the strain of the raceway member 4 in the vicinity of rolling bodies 6 as magnetostrictive variations.

Figure 3:
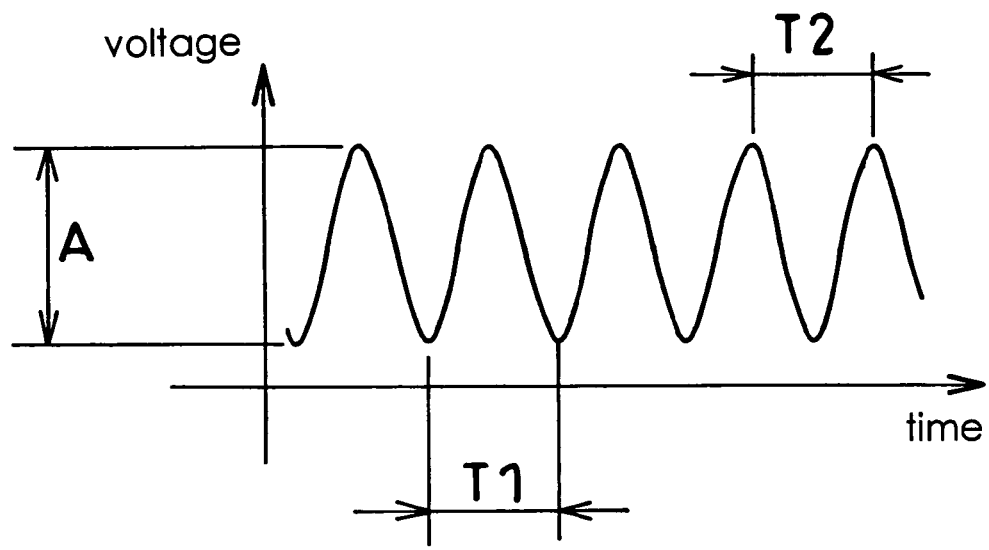
FIG. 3 is a diagram showing an example of output of a magnetostrictive sensor of the hub unit of the first embodiment.

With reference to FIG. 3, a variation in the ground contact load on the tire varies the force acting on the rolling bodies 6, altering the amounts of strain of the wheel-side raceway member 4 and the body-side raceway member 5 in the vicinity of the rolling bodies 6. Between the number of revolutions, Nb, of the rolling body and the number of rotations, Ni, of the wheel-side raceway member 4, there is the relationship of Nb≈Ni/2 assuming that the contact angle is small, so that the time required for one turn of rotation of the wheel-side raceway member 4 is given by multiplying the period (T1 or T2) of strain by the number of rolling bodies and doubling the product. Accordingly, the number of rotations of the wheel-side raceway member 4 can be determined from the number of repetitions of strain variation. Incidentally, when the contact angle is $\alpha$, the relationship between the number of revolutions, Nb, of the rolling body and the number of rotations, Ni, of the inner ring is given by Nb=(1−d cos $\alpha$/D)Ni/2 wherein D is the pitch diameter of the rolling body and d is the diameter of the rolling body. On the other hand, the maximum value of the force exerted by the rolling bodies on the wheel-side raceway member 4 and the body-side raceway member 5 can be determined using the amplitude A of strain. The ground contact load can be obtained from the resulting value.

With the sensor-equipped hub unit, the magnetic field set up by the magnetized portion 34 alters, and this alteration is detected by the magnetic impedance sensor 31, which produces a voltage variation as an output. The processing means 32 of the sensor device 2 has stored therein an equation for calculating a variation in the ground contact load from the magnetostrictive variation output as a voltage variation, and the processing means 32 determines the variation in the ground contact load based on the output of the sensor 31. The ground contact load variation obtained is fed to vehicle control means for the proper control of the vehicle.

With the foregoing embodiment, the strain of the wheel-side raceway member is detected, whereas the strain of the body-side raceway member may be detected. In place of the magnetic impedance sensor, stress impedance sensor is alternatively usable as the magnetostrictive sensor. In either case, the magnetized portion can be dispensed with.

Although the above embodiment has been described with reference to a hub unit which is an example of antifriction bearing device, the construction described above and having a magnetostrictive sensor is applicable to various sensor-equipped antifriction bearing units comprising raceway members and rolling bodies. In this case, the rotation of the wheel in the hub unit corresponds to the rotation of the rotating shaft (rotation-side raceway member) in the antifriction bearing unit, and the ground contact load in the hub unit to the load (force) acting on the raceway member (rotation-side raceway member or fixed-side raceway member) in the antifriction bearing unit, and these values are detectable by the magnetostrictive sensor.

Figure 4:
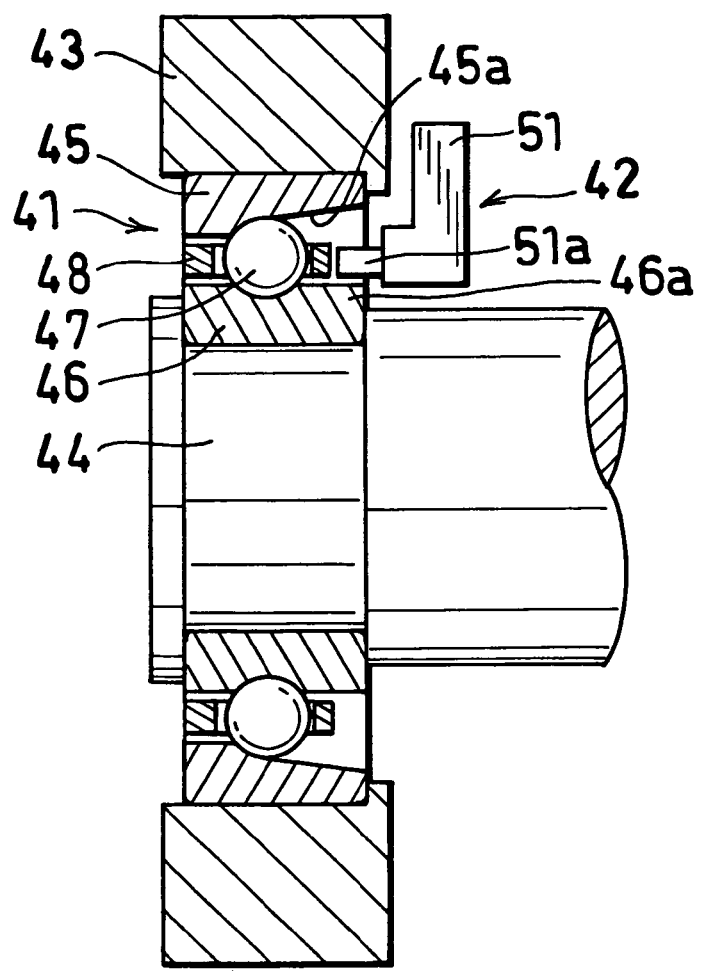
FIG. 4 is a view in vertical section showing a sensor-equipped hub unit as a second embodiment of sensor-equipped antifriction bearing unit according to the invention.
Figure 5:
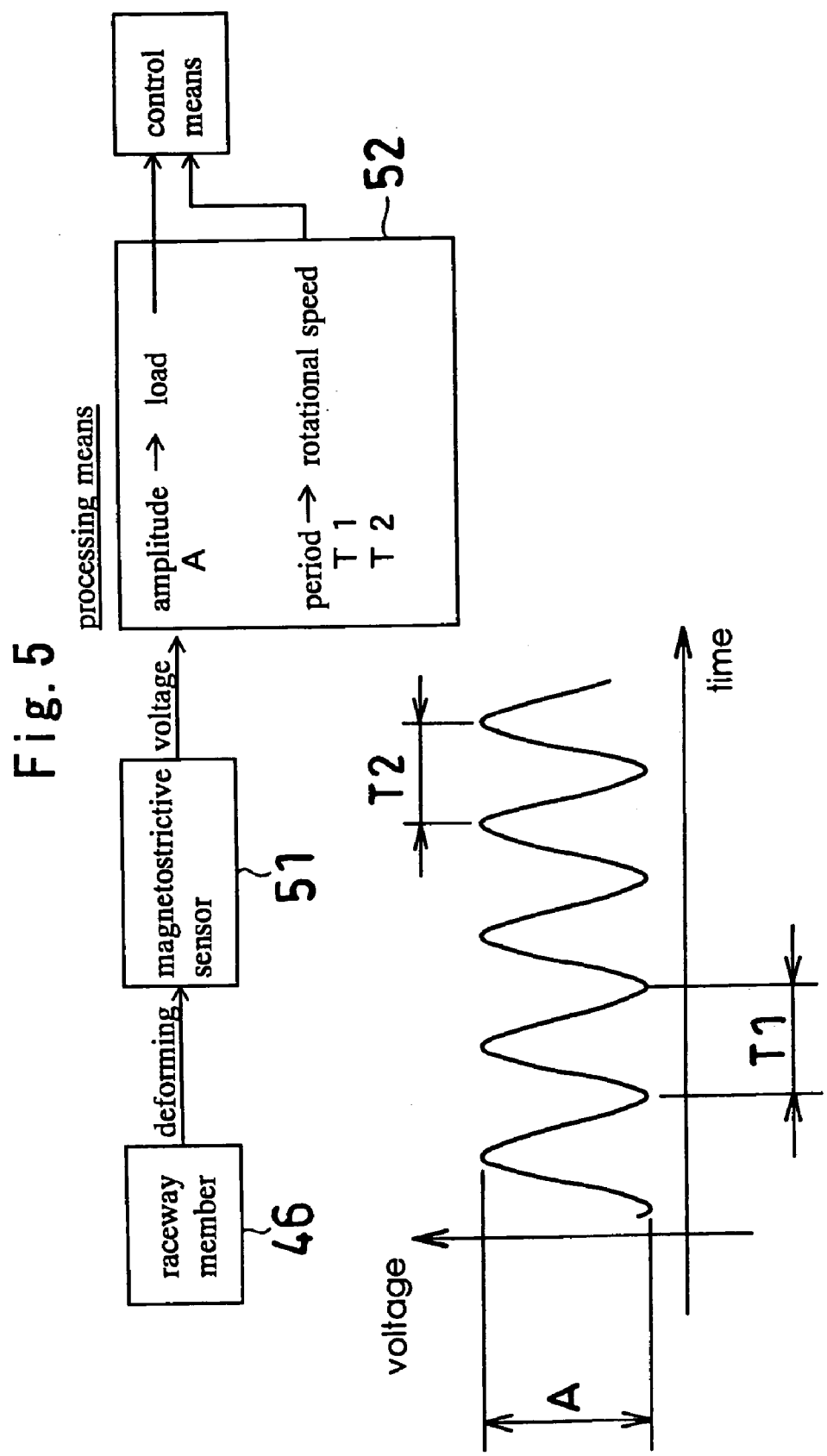
FIG. 5 is a block diagram of a sensor device of the hub unit of the second embodiment.

FIGS. 4 and 5 show a second embodiment of sensor-equipped antifriction bearing unit of the present invention. In the following description, the terms "left" and "right" refer respectively to the left- and right-hand sides of FIG. 4.

With reference to FIG. 4, the sensor-equipped antifriction bearing unit comprises an antifriction bearing 41 and a sensor device 42 provided on the bearing 41.

The antifriction bearing 41 comprises a fixed-side raceway member (outer ring) 45 fixed to a housing 43, a rotation-side raceway member (inner ring) 46 fixed to a rotating shaft 44, a plurality of balls 47 arranged between these raceway members and serving as rolling bodies, and a retainer 48 holding the balls 47 thereon.

According to this embodiment, the fixed-side raceway member 45 and the rotation-side raceway member 46 are made of a high-carbon chromium bearing steel (SUJ2), the balls 47 are made of ceramic, and the retainer 48 is made of brass. The raceway members 45, 46 have magnetic properties, while the balls 47 and retainer 48 are made of a nonmagnetic material.

The sensor device 42 comprises a magnetostrictive sensor 51 attached to the housing 43, and means 52 (not shown in FIG. 4, see FIG. 5) for processing the output of the magnetostrictive sensor 51.

According to this embodiment, the magnetostrictive sensor 51 is a magnetic impedance sensor and has a sensing portion 51a which is positioned at a shoulder portion 46a of the rotation-side raceway member 46. A shoulder portion of the fixed-side raceway member 45 which portion is opposed to this shoulder portion 46a has a counterbore 45a. The shoulder portion 46a of the rotation-side raceway member 46 produces a reverse magnetostrictive effect with variations in the strain resulting from the force exerted thereon by the balls 47. For this reason, variations in the strain of the rotation-side raceway member 46 in the vicinity of the balls 47 can be detected by the magnetic impedance sensor serving as the magnetostrictive sensor 51.

The strain caused to the rotation-side raceway member 46 has a waveform shown in FIG. 5 and can be measured as an output of the magnetostrictive sensor. Between the number of revolutions, Nb, of the ball 47 and the number of rotations, Ni, of the rotation-side raceway member 46, there is the relationship of Nb≈Ni/2 assuming that the contact angle is small, so that the time required for one turn of rotation of the rotation-side raceway member 46 is given by multiplying the period (T1 or T2) of strain by the number of balls 47, doubling the product and finely adjusting an amount due, for example, to the slippage of the balls 47. Thus, the number of rotations of the rotation-side raceway member 46 can be determined from the number of repetitions of strain variation. Incidentally, when the contact angle is $\alpha$, the relationship between the number of revolutions, Nb, of the ball 47 and the number of rotations, Ni, of the inner ring is given by $Nb=(1-d \cos \alpha/D)Ni/2$ wherein D is the pitch diameter of the ball and d is the diameter of the ball. On the other hand, the processing means 52 has stored therein an equation for calculating a variation in the force exerted on the rotation-side raceway member 46 from the amplitude of strain output as a voltage variation. The maximum value of the force exerted by the balls 47 on the rotation-side raceway member 46 can be determined using the amplitude A of strain, and the force acting on the rotation-side raceway member 46 can be determined using the value.

Even if the balls 47 and the retainer 48 move toward or away from the magnetostrictive sensor 51 with the rotation of the rotation-side raceway member 46 when the strain is detected, the magnetic field in the vicinity of the shoulder portion 46a of the raceway member 46 remains unaffected since the balls and retainer are not made from a magnetic material. Consequently, no error (noise) occurs due to the movement of the balls 47 and the retainer 48. This serves to greatly diminish the errors to be involved in the data detected by the magnetostrictive sensor 51 of high sensitivity.

With sensor-equipped antifriction bearing unit of the second embodiment, the magnetostrictive sensor 51 determines the rotation (number of rotations, rotational speed, angle of rotation, etc.) of the antifriction bearing 41, and accurately detects the force acting on the bearing 41, and the rotational data is fed to control means for use in properly controlling the rotating shaft 44.

Figure 6:
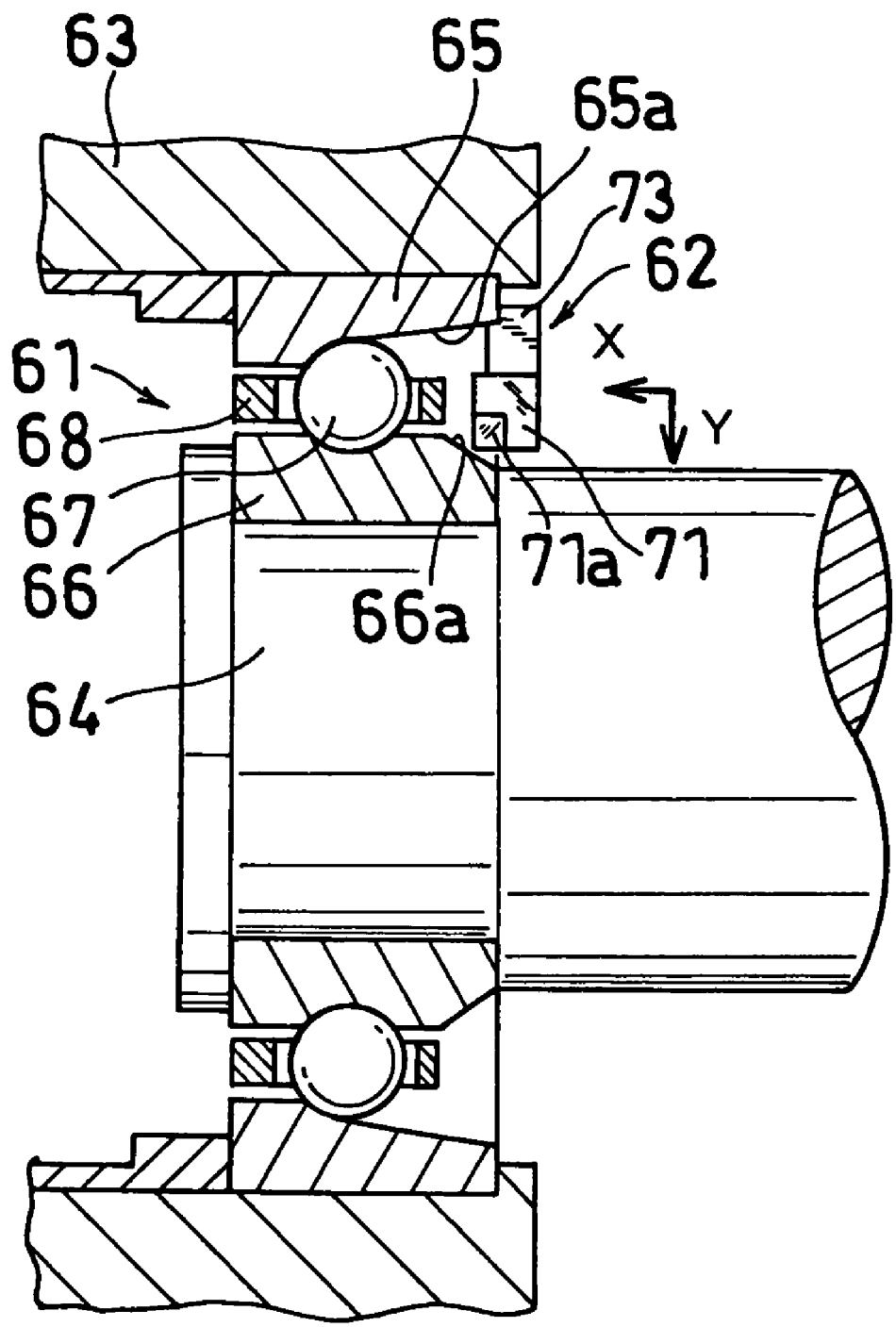
FIG. 6 is a view in vertical section showing a sensor-equipped hub unit as a third embodiment of sensor-equipped antifriction bearing unit according to the invention.

FIGS. 6 and 7 show a third embodiment of sensor-equipped antifriction bearing unit. In the following description, the terms "left" and "right" refer respectively to the left-and right-hand sides of FIG. 6.

With reference to FIG. 6, the sensor-equipped antifriction bearing unit comprises an antifriction bearing 61 and a sensor device 62 provided on the bearing 61.

The antifriction bearing 61 comprises a fixed-side raceway member (outer ring) 65 fixed to a housing 63, a rotation-side raceway member (inner ring) 66 fixed to a rotating shaft 64, a plurality of rolling bodies (balls) 67 arranged between these raceway members, and a retainer 68 holding the rolling bodies 67 thereon.

According to this embodiment, the fixed-side raceway member 65 and the rotation-side raceway member 66 are made of a high-carbon chromium bearing steel (SUJ2), the rolling bodies 67 are made of ceramic, and the retainer 68 is made of brass. The raceway members 65, 66 have magnetic properties, while the rolling bodies 67 and retainer 68 are made of a nonmagnetic material.

The sensor device 62 comprises a magnetostrictive sensor 71 attached to the fixed-side raceway member 65 by a mount member 73, and means 72 (not shown in FIG. 6, see FIG. 7) for processing the output of the magnetostrictive sensor 71.

According to this embodiment, the magnetostrictive sensor 71 is a magnetic impedance sensor having a detecting face in the axial direction (X-axis direction) and a detecting face in the radial direction (Y-axis direction) and has a sensing portion 71a which is opposed to a tapered portion 66a provided at a shoulder portion of the rotation-side raceway member 66. A counterbore 65a is formed in the fixed-side raceway member 65 at a shoulder portion thereof opposed to this shoulder portion 66a.

With reference to FIG. 7, the processing means 72 has a load calculating unit 72a for determining the load on the rotation-side raceway member 66 from the amplitude of a high-frequency component of a Y-axis signal from the magnetostrictive sensor 71, a radial displacement calculating unit 72b for determining the radial displacement of the rotation-side raceway member 66 from the amplitude of a low-frequency component of the Y-axis signal from the sensor 71, a retainer rotational speed calculating unit 72c for determining the speed of revolution of the rolling body 67 (accordingly the rotational speed of the retainer 68) from the period of the high-frequency component of the Y-axis signal from the sensor 71, a rotational speed calculating unit 72d for determining the rotational speed, the number of rotations, etc. of the rotation-side raceway member 66 from the period of the low-frequency component of the Y-axis signal from the sensor 71, and an axial displacement calculating unit 72e for determining the axial displacement of the rotation-side raceway member 66 from the amplitude of the low-frequency component of an X-axis signal from the sensor 71.

The load and the retainer rotational speed are detected using as a source of magnetic force the magnetostriction (reverse magnetostrictive effect) produced when the shoulder portion 66a of the inner ring 66 is strained by the rolling bodies 67, and variations in the load are determined from variations in the strain of the shoulder portion. The radial displacement (including eccentricity and amount of expansion), and the rotational speed and axial displacement (including axial deflection) of the rotation-side raceway member 66 are detected using as a source of magnetic force a minute residual magnetic flux produced when a workpiece is made into the inner ring 66 and remaining in the product. These items of data are determined from the above displacement or amount of expansion, and changes in magnetic flux attributable to the variation in the air gap between the sensor 71 and the surface 66a to be detected (inner ring shoulder portion) due to rotation.

With the sensor-equipped antifriction bearing unit described, the rotation-side raceway member (inner ring) 66 rotates, permitting the rolling bodies 67 to strain the inner ring shoulder portion 66a to which the sensing portion 71a of the magnetostrictive sensor 71 is opposed, whereupon a reverse magnetostrictive effect produces a minute magnetic force in the shoulder portion 66a to cause the sensor 71 to deliver an increased output. When a space between adjacent rolling bodies 67 is positioned as opposed to the sensing portion 71a, the strain of the shoulder portion 66a reduces to diminish the magnetic force, consequently decreasing the output of the sensor 71. Such variations are in the form of sine waves (first SIN waves) having a frequency equal to the revolution frequency of the rolling body 67 multiplied by the number of rolling bodies, and variations in the amplitude thereof are correlated with the radial load. On the other hand, when the sensing portion 71a of the sensor 71 is brought toward the surface to be detected of the inner ring shoulder portion 66a due to eccentricity of the inner ring 66, the output of the sensor 71 increases, while when the sensing portion 71a of the sensor 71 moves away from the surface to be detected of the inner ring shoulder portion 66a, the sensor output decreases. These variations are in the form of sine waves (second SIN waves) having a frequency equal to the rotation frequency of the inner ring. Usually, the revolution frequency of the rolling body 67 is smaller than the rotation frequency of the inner ring 66.

The radial (Y-axis) direction detecting element of the magnetostrictive sensor 71 produces superposed waves of first SIN waves and second SIN waves shown in FIG. 8(a) as raw waves. With reference to FIG. 8(a), the amplitude of waves indicated at A corresponds to the load on the inner ring 66. When the output signal of superposed waves is subjected to FFT, the frequency of first SIN waves and that of second SIN waves can be determined as shown in FIG. 8(b). When the signal is processed by LPF (low-pass filter) with the filtration condition of "smaller than the frequency of first SIN waves multiplied by 0.9," the graph of FIG. 8(c) is available. With reference to FIG. 8(c), indicated at B is the amount of eccentricity of the inner ring 66 or the amount of expansion thereof due to a centrifugal force, at C is the radial displacement of the inner ring 66, and at D is the reciprocal of the rotation frequency of the inner ring 66.

Similarly, the axial (X-axis) direction detecting element of the magnetostrictive sensor 71 produces, as raw waves, superposed waves of first SIN waves due to the revolution, of the rolling bodies 67 and second SIN waves due to the rotation of the inner ring 66 as shown in FIG. 9(a). With reference to FIG. 9(a), the amplitude of waves indicated at E corresponds to the load on the inner ring 66. When the signal of superposed waves is processed by LPF with the filtration condition of "smaller than the frequency of first SIN waves multiplied by 0.9," the graph of FIG. 9(b) is obtained. With reference to FIG. 9(b), F corresponds to the undulation of machining of the end face of the inner ring 66, and indicated at G is axial displacement of the inner ring 66.

The load calculating unit 72a of the processing means 72 determines the load on the rotation-side raceway member 66 from the amplitude of waves indicated in a broken line in the graph of FIG. 8(c) (amplitude of high-frequency component of the Y-axis signal from the sensor 71). The radial displacement calculating unit 72b of the processing means 72 determines the radial displacement of the rotation-side raceway member 66 from C in the graph of FIG. 8(c) (amount of shift of the low-frequency component waveform of the Y-axis signal from the sensor 71), and B (amount of eccentricity) in the graph of FIG. 8(c) can also be determined at this time. The retainer rotational speed calculating unit 72c of the processing means 72 determines the speed of revolution of the rolling body 67 (accordingly the rotational speed of the retainer 68) from the frequency of first SIN waves in FIG. 8(b) (reciprocal of the period of the high-frequency component of the Y-axis signal from the sensor 71). The rotational speed calculating unit 72d of the processing means 72 determines the rotational speed, the number of rotations, etc. of the rotation-side raceway member 66 from the frequency of second SIN waves in FIG. 8(b) (reciprocal of the period of the low-frequency component of the Y-axis signal from the sensor 71). The axial displacement calculating unit 72e of the processing means 72 determines the axial displacement of the rotation-side raceway member 66 from G in the graph of FIG. 9(b) (amount of shift of the low-frequency component waveform of the X-axis signal from the sensor 71), and F (undulation of machining of the end face) in the graph of FIG. 9(b) can also be determined at this time.

Although only the axial displacement of the rotation-side raceway member 66 is determined from the X-axis signal of the magnetostrictive sensor 72, the X-axis signal is usable like the Y-axis signal for determining the force acting on the rotation-side raceway member 66, the retainer rotational speed, the number of rotations thereof, the rotational speed of the rotation-side raceway member 66 and the number of rotations thereof. The undulation of the end face machining can be utilized for determining other physical quantities.

With the sensor-equipped antifriction bearing unit of the third embodiment described above, the magnetostrictive sensor 71 affords the five physical quantities of the axial displacement of the rotation-side raceway member 66, radial displacement of the rotation-side raceway member 66, the load on the rotation-side raceway member 66, the rotational speed (including the number of rotations) of the rotation-side raceway member, and the speed of revolution of the rolling body 67. The rotating shaft 64 is properly controlled based on the axial displacement of the rotation-side raceway member 66, the radial displacement of this member 66, the load on the member 66 and the rotational speed of the member 66, and the antifriction bearing 61 is checked for malfunctions by monitoring, based on the speed of revolution of the rolling body 67, eccentricity or amount of expansion.

With the sensor-equipped antifriction bearing unit of the third embodiment described above, the magnetostrictive sensor 71 is a magnetic impedance sensor having a detecting face in the axial direction (X-axis direction) and a detecting face in the radial direction (Y-axis direction), whereas a magnetostrictive sensor is usable which comprises only a magnetic impedance sensor having the detecting face of the above sensor 71 in the radial direction (Y-axis direction). Different items of data can then by detected by one sensor as will be described below.

Figure 10:
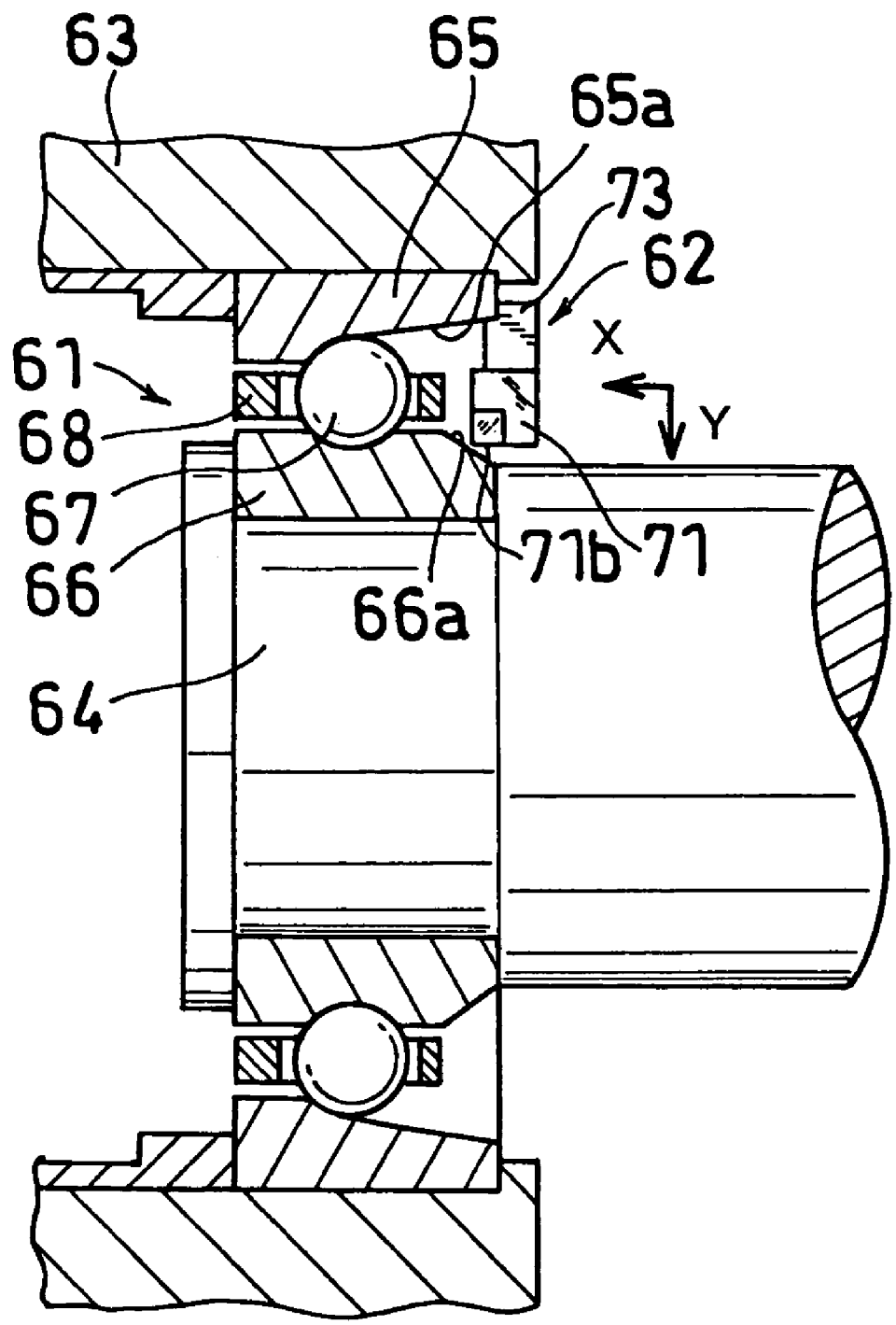
FIG. 10 is a view in vertical section showing a sensor-equipped hub unit as a fourth or fifth embodiment of sensor-equipped antifriction bearing unit according to the invention.

FIG. 10 shows a fourth embodiment of sensor-equipped antifriction bearing unit of the present invention which has the same construction as the one shown in FIG. 6. The unit has a sensor device 62 comprising a magnetostrictive sensor 71 which has a detecting face 71b in the radial direction. The sensor 71 detects the eccentricity of the rotation-side raceway member 66 and the force acting on the member 66.

The items of data obtained by the bearing unit of the fourth embodiment are the same as those shown in FIG. 7 except the data as to the axial displacement of the rotation-side raceway member 66. Although the data will not be described in detail, the bearing unit of the present embodiment detects the force acting on the rotation-side raceway member 66 contactlessly with high accuracy by the magnetostrictive sensor 71, which also affords data as to the eccentricity of the raceway member 66. The eccentricity data is usable for checking the antifriction bearing 61 for malfunctions by monitoring. In this way, items of data of different kinds, i.e., the force acting on the raceway member and the data for use in checking the antifriction bearing for malfunctions, are available by one magnetostrictive sensor 71.

A fifth embodiment of sensor-equipped antifriction bearing unit of the invention has the same construction as the fourth embodiment shown in FIG. 10. The unit has a sensor device 62 comprising a magnetostrictive sensor 71 which has a detecting face 71b in the radial direction. The sensor 71 detects the amount of expansion of the rotation-side raceway member 66 and the force acting on the member 66.

The items of data obtained by the bearing unit of the fifth embodiment are the same as those shown in FIG. 7 except for the data as to the axial displacement of the rotation-side raceway member 66. Although the data will not be described in detail, the bearing unit of the present embodiment detects the force acting on the rotation-side raceway member 66 contactlessly with high accuracy by the magnetostrictive sensor 71, which also affords the amount of expansion of the raceway member 66. The data of the amount of expansion is usable for checking the antifriction bearing 61 for abnormal rotational speeds or abnormal temperatures by monitoring since the amount of expansion varies with the centrifugal force (rotational speed) and heat. In this way, items of data of different kinds, i.e., the force acting on the raceway member and the data for use in checking the antifriction bearing for malfunctions, are available by one magnetostrictive sensor 71.

The nonmagnetic materials used for the rolling bodies 67 and the retainer 68 of the third to fifth embodiments serve to minimize ambient magnetic flux as noise, permitting the sensor to accurately detect minute variations in magnetic flux due to the reverse magnetostrictive effect.

Although the sensor device 62 is fixed to the outer ring 65 according to the third to fifth embodiments, the sensor device 62 may be fixed alternatively to the inner ring, housing or other member. In the case where the sensor device is fixed to the raceway member (inner ring or outer ring), the antifriction bearing unit becomes independent of the housing or the like and becomes easy to handle. Suitable signal processing means, if additionally provided, makes it possible to detect the amount of eccentricity, the amount of expansion and physical quantities to be detected utilizing the end face machining undulation at the same time.

In the case of the foregoing embodiments, the first embodiment is a hub unit, and the second to fifth embodiments are common antifriction bearings, while the invention can be embodied as hub units which are common antifriction bearings, while common antifriction bearings embodying the invention can be hub units.

INDUSTRIAL APPLICABILITY

When the sensor-equipped antifriction bearing unit of the invention is used in place of antifriction bearings as used in various devices, various items of data as to the antifriction bearing and the device incorporating the bearing can be detected to ensure improved control of the device.

The sensor-equipped hub unit of the invention, when used in place of the hub units included in motor vehicles, makes it possible to detect various items of data as to the motor vehicle to realize improved control of the vehicle.

The invention claimed is:

1. A sensor-equipped antifriction bearing unit comprising an antifriction bearing having a fixed-side raceway member, a rotation-side raceway member and rolling bodies, and a sensor device provided on the bearing,
   wherein the rotation-side raceway member is made of a magnetic material and the sensor device has a magnetostrictive sensor for detecting directly a reverse magnetostrictive effect of the rotation-side raceway member itself produced by a force exerted thereon by the rolling bodies.

2. A sensor-equipped antifriction bearing unit according to claim 1, the sensor device detects rotation from the number of repetitions of a variation in strain and also detects the force acting on the raceway member from the amplitude of strain.

3. A sensor-equipped antifriction bearing unit according to claim 1, wherein the rolling bodies are made of a nonmagnetic material.

4. A sensor-equipped antifriction bearing unit according to claim 3 wherein the antifriction bearing further has a retainer, and the retainer is made of a nonmagnetic material.

5. A sensor-equipped antifriction bearing unit according to claim 1 wherein the magnetostrictive sensor has a detecting face in a radial direction, is attached to a fixed-side member and detects the eccentricity of the rotation-side raceway member and the force acting on the rotation-side raceway member.

6. A sensor-equipped antifriction bearing unit according to claim 1 wherein the magnetostrictive sensor has a detecting face in a radial direction, is attached to a fixed-side member and detects the amount of expansion of the rotation-side raceway member and the force acting on the rotation-side raceway member.

7. A sensor-equipped antifriction bearing unit according to claim 1 wherein the magnetostrictive sensor is a magnetic impedance sensor and is attached to a fixed-side member, and the rotation-side raceway member is provided with an annular magnetized portion opposed to the sensor.

8. A sensor-equipped antifriction bearing unit comprising an antifriction bearing having a fixed-side raceway member, a rotation-side raceway member and rolling bodies, and a sensor device provided on the bearing,
   wherein the sensor device has a magnetostrictive sensor for detecting a reverse magnetostrictive effect of the rotation-side raceway member produced by a force exerted thereon by the rolling bodies, wherein the magnetostrictive sensor has a detecting face in an axial direction and a detecting face in a radial direction, is attached to a fixed-side member and detects all of the axial displacement of the rotation-side raceway member, the radial displacement of the rotation-side raceway member, the force acting on the rotation-side raceway member and rotation data thereof.

9. A sensor-equipped antifriction bearing unit according to claim 8 wherein the rotational speed of the rotation-side raceway member to be determined from variations in the axial displacement or the radial displacement thereof with time and the speed of revolution of the rolling body to be determined from the number of repetitions of a variation in the strain of the rotation-side raceway member are detected as the rotation data.

10. A sensor-equipped antifriction bearing unit according to claim 8 wherein changes in residual magnetic flux of the rotation-side raceway member are detected to detect the axial displacement and the radial displacement of the rotation-side raceway member.

11. A sensor-equipped hub unit comprising a hub unit having a wheel-side raceway member to be attached to a wheel, a body-side raceway member to be fixed to a vehicle body, and two rows of rolling bodies arranged between the two raceway members, and a sensor device provided on the hub unit,
   wherein wheel-side raceway member is made of a magnetic material and the sensor device has a magnetostrictive sensor for detecting directly a reverse magnetostrictive effect of the wheel-side raceway member itself produced by a force exerted thereon by the rolling bodies.

12. A sensor-equipped hub unit according to claim 11, wherein the sensor device detects the rotation of the wheel from the number of repetitions of a variation in strain and also detects the ground contact load on the wheel from the amplitude of strain.

13. A sensor-equipped hub unit according to claim 11, wherein the rolling bodies are made of a nonmagnetic material.

14. A sensor-equipped hub unit according to claim 13 wherein the hub unit further has a retainer, and the retainer is made of a nonmagnetic material.

15. A sensor-equipped hub unit according to claim 11 wherein the magnetostrictive sensor has a detecting face in a radial direction, is attached to a body-side member and detects the eccentricity of the wheel-side raceway member and the force acting on the wheel-side raceway member.

16. A sensor-equipped hub unit according to claim 11 wherein the magnetostrictive sensor has a detecting face in a radial direction, is attached to a body-side member and detects the amount of expansion of the wheel-side raceway member and the force acting on the wheel-side raceway member.

17. A sensor-equipped hub unit according to claim 11 wherein the magnetostrictive sensor is a magnetic impedance sensor and is attached to a wheel-side member, and the wheel-side raceway member is provided with an annular magnetized portion opposed to the sensor.

18. A sensor-equipped hub unit having a wheel-side raceway member to be attached to a wheel, a body-side raceway member to be fixed to a vehicle body, and two rows of rolling bodies arranged between the two raceway members, and a sensor device provided on the hub unit, wherein the sensor device has a magnetostrictive sensor for detecting a reverse magnetostrictive effect of the wheel-side raceway member produced by a force exerted thereon by the rolling bodies, wherein the magnetostrictive sensor has a detecting face in an axial direction and a detecting face in a radial direction, is attached to a body-side member and detects all of the axial displacement of the wheel-side raceway member, the radial displacement of the wheel-side raceway member, the force acting on the wheel-side raceway member and rotation data thereof.

19. A sensor-equipped hub unit according to claim 18 wherein the rotational speed of the wheel-side raceway member to be determined from variations in the axial displacement or the radial displacement thereof with time and the speed of revolution of the rolling body to be determined from the number of repetitions of a variation in the strain of the wheel-side raceway member are detected as the rotation data.

20. A sensor-equipped hub unit according to claim 18 wherein changes in residual magnetic flux of the wheel-side raceway member are detected to detect the axial displacement and the radial displacement of the wheel-side raceway member.

* * * * *